Sept. 3, 1968
W. M. GOODWIN
3,399,791
SIDE DUMPING TRAILER
Filed Sept. 26, 1966
3 Sheets-Sheet 1
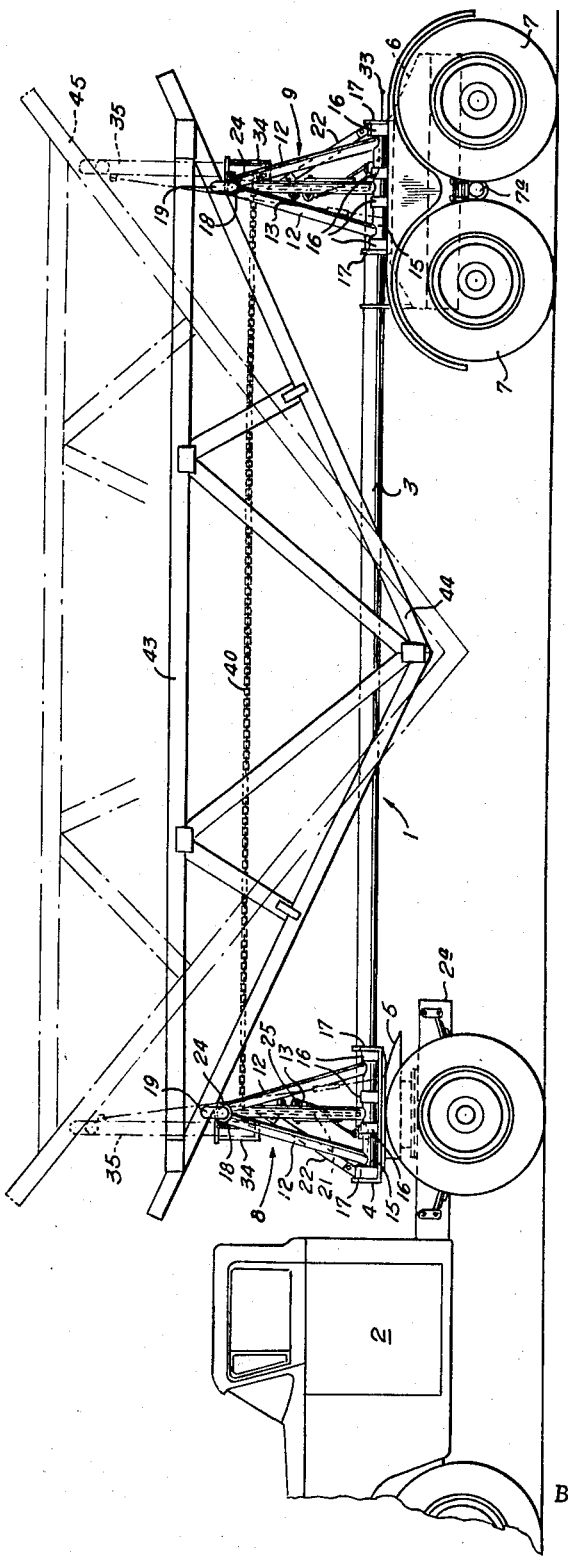
Fig. I
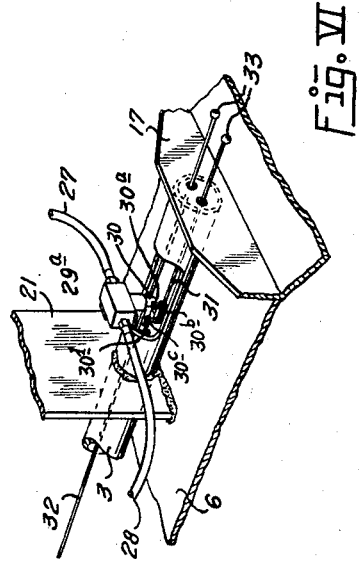
Fig. VI
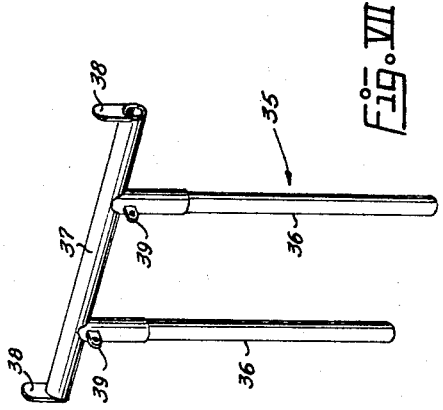
Fig. VII
INVENTOR
Wayne M. Goodwin
BY Howard E. Moore
ATTORNEY Sept. 3, 1968          W. M. GOODWIN                    3,399,791
                      SIDE DUMPING TRAILER
Filed Sept. 26, 1966                              3 Sheets-Sheet 2
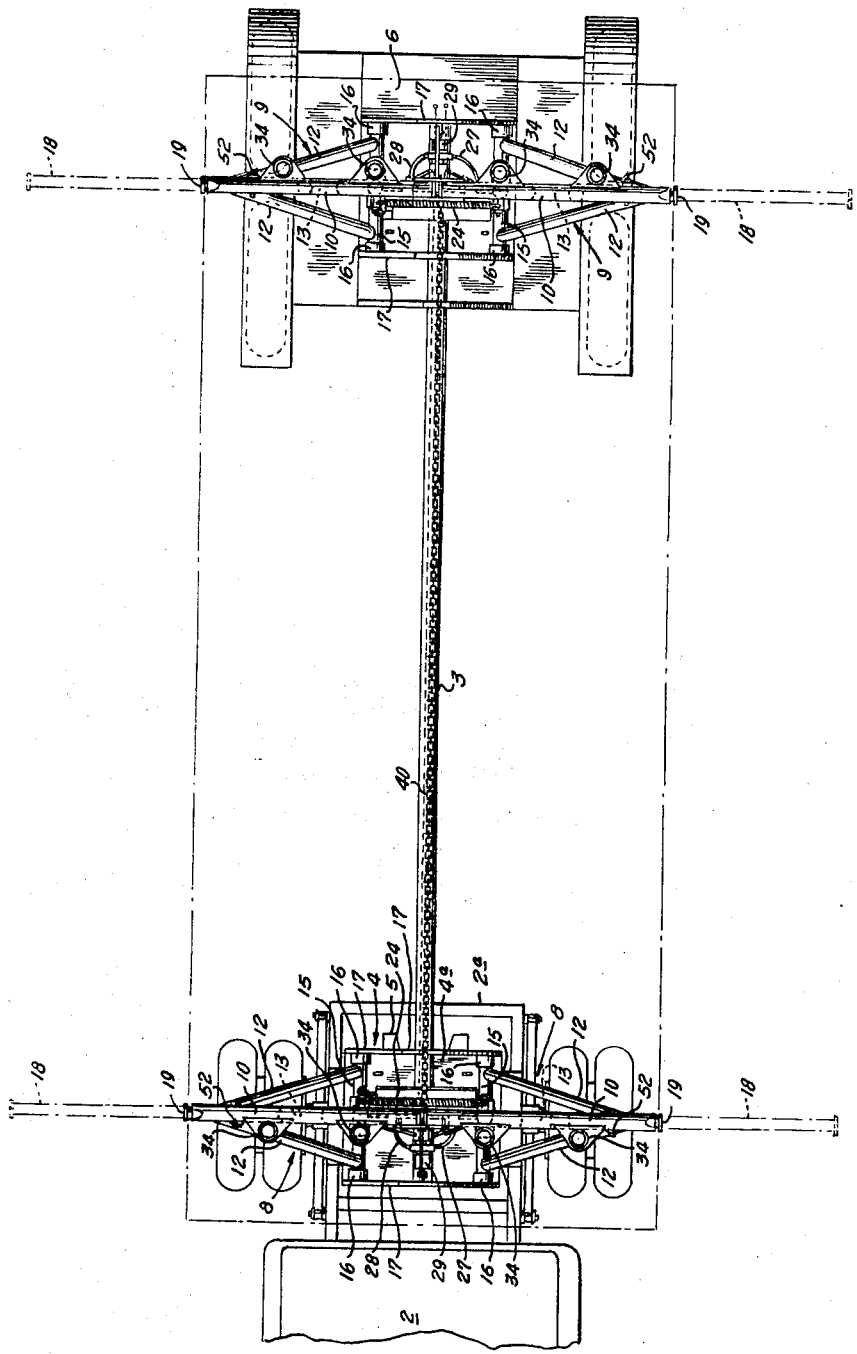
Fig. II
INVENTOR
Wayne M. Goodwin
BY Howard E. Moore
ATTORNEY Sept. 3, 1968  W. M. GOODWIN  3,399,791
SIDE DUMPING TRAILER
Filed Sept. 26, 1966  3 Sheets-Sheet 3
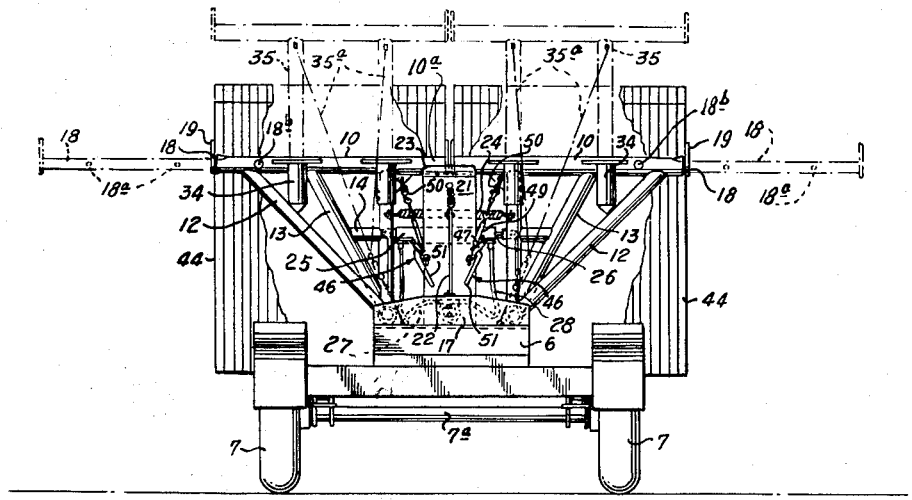
Fig. III
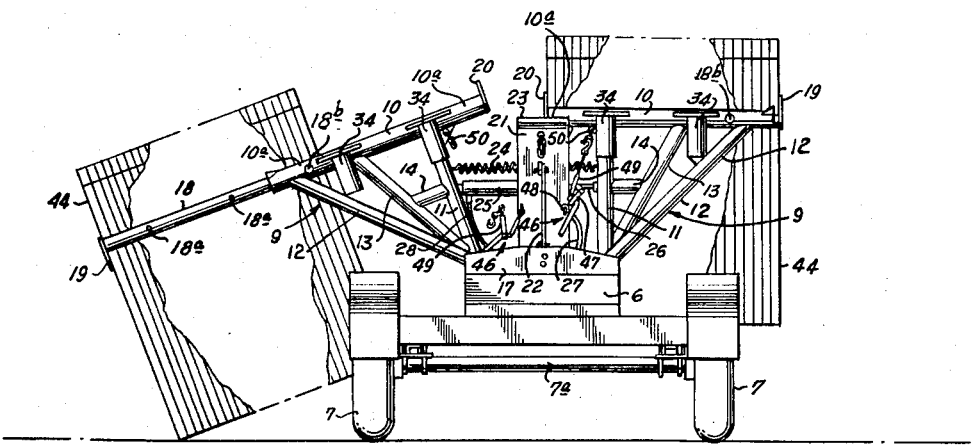
Fig. IV
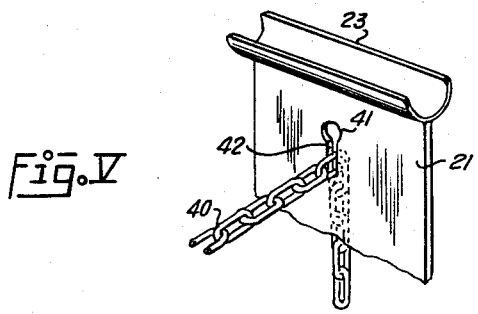
Fig. V
INVENTOR
Wayne M. Goodwin
BY *Howard E. Moore*
ATTORNEY

United States Patent Office 3,399,791
Patented Sept. 3, 1968

3,399,791
SIDE DUMPING TRAILER
Wayne M. Goodwin, Dallas, Tex., assignor to Barns Lumber and Manufacturing Company, Dallas, Tex., a corporation of Texas
Filed Sept. 26, 1966, Ser. No. 581,779
8 Claims. (Cl. 214—77)

This invention is concerned with a trailer apparatus arranged to be towed behind a truck and is particularly concerned with a trailer apparatus having frame supporting members which are pivotally mounted on the trailer frame so that they can be pivoted outwardly and downwardly, either individually or collectively, to deposit a load carried thereon. The invention is particularly related to improvements in that type of side-dumping trailer disclosed and claimed in my earlier Patent No. 3,091,498, filed May 28, 1963, entitled, Side Dumping Trailer, to which reference is hereby made.

The present invention is intended to correct and overcome certain shortcomings in the side dumping trailer disclosed in said patent.

It was found in the use of said device that in unloading bundles of roof trusses which are deposited upon the ground when the pivoted frame members are allowed to move arcuately outwardly and downwardly, the roof trusses were often damaged by falling with considerable impact on the ground, causing them to be cracked or broken.

The present invention includes extendable supports for the roof trusses which supports are slidably telescoped in the horizontal members of the support frame which may be extended outwardly to support the roof trusses as they slide off the frame and thereby permits the bundle of roof trusses to be gently deposited upon the ground, thereby preventing damage thereto.

Another shortcoming in the use of the device shown in said earlier patent was the fact that only a limited number of roof trusses could be transported on the pivoted frames because the apexes of the triangular shaped roof trusses would engage the ground if they were more than a certain dimension.

Provision has been made in the present structure to overcome this shortcoming by providing spaced sockets on the upper horizontal members of the pivoted frames arranged to removably receive extension supports to thereby, in effect, extend the support frames upwardly whereby larger roof trusses can be carried thereon without engaging the ground.

Provision has also been made in the improved structure disclosed herein whereby the hydraulic rams arranged at each end of the trailer device for supporting and allowing the cushioned movement downwardly of the support frames are actuated by valve control members which are accessible at one end of the trailer device and which does not require any external hydraulic system to energize and operate same.

It is therefore a primary object of the invention to provide means in a side-dumping trailer which operates to gently deposit the roof trusses or other articles transported thereby, on the ground, to thereby prevent damage thereto.

Another object of the invention is the provision of means attachable to the upper surface of the horizontal members of the support frames to effectively raise the height of the support frames.

Still another object of the invention is the provision of hydraulic means to support the pivoted support members in upward position which may be actuated to allow the cushioned lowering of the support frames in response to the weight of the load on the support frames.

A still further object of the invention is to provide means accessible at one end of the trailer for actuation of the hydraulic means at both ends of the trailer.

A still further object of the invention is the provision of means to allow the selective lowering of the pivoted support frames on each side and ends of the trailer.

Other and further objects of the invention will become apparent upon reading the detailed specification hereinafter following and by referring to the drawings annexed hereto.

A suitable embodiment of the invention is shown in the attached drawings wherein, FIGURE I is a side elevational view of the side dumping trailer as it will appear with a load of roof trusses supported thereon, and showing in broken lines the extension frames attached to the upper sides of the pivoted support members for supporting enlarged roof trusses.

FIGURE II is a top plan view of the side dumping trailer,

FIGURE III is a rear elevational view of the side dumping trailer showing two bundles of roof trusses supported thereon, and showing in broken lines the detachable upward extension of the pivoted support members.

FIGURE IV is a rear elevational view of the side dumping trailer, showing the pivoted support members one one side of the trailer pivoted outwardly as they will appear when unloading a bundle of roof trusses, and showing the extensible arms in extended position, FIGURE V is an upper perspective view of the cradle attached to the upper end of the support standards at each end of the trailer, FIGURE VI is a perspective view of a typical control valve for the hydraulic system and the controls for actuating the hydraulic system from one end of the trailer;

FIGURE VII is an upper perspective view of a typical extension frame attachable to the upper side of the support frames to permit enlarged trusses to be hauled thereon.

Numeral references are employed to designate various parts shown in the drawings and like numerals indicate like parts throughout the various figures of the drawings.

The numeral 1 generally indicates the frame of the trailer which is pivotally attached for transverse movement to the frame extension 2a of the conventional truck or tractor 2.

The frame 1 includes a central tubular support member 3 which has secured thereto a front end frame member 4 which includes a base plate 4a and vertical end plates 17 and is supported upon a rotatable fifth wheel 5.

A rear end frame member 6 supported upon a rotatable fifth wheel 5 rotatably carried on the truck frame 2a.

A rear end frame member 6 is secured to the central support member 3, and is supported on wheels 7 supported on springs 7b which are in turn supported by a transverse bar 7a.

Front load support frames 8 and rear load support frames 9 are identical in construction and are pivotally mounted on the front frame 4 and rear frame 6, respectively, as will be hereinafter described in more detail.

As will be seen in FIGURES III and IV each of the front and rear load support frames 8 and 9 includes an upper transverse portion 10, vertical members 11 and angularly disposed brace members 12 and 13. Cross braces 14 are provided between the vertical members 11 and the angular brace members 13. The vertical members 11 and angular base members 12 and 13 are secured at their lower ends to cylindrical pivot shafts 15 which are pivotally supported in bearing sleeves 16 secured to the mounting frames 4 and 6 and to the end plates 17 thereon.

A tubular extension arm 18 is telescopically disposed in each horizontal member 10 and is arranged to slide inwardly and outwardly thereof. Each extension arm 18 has a lug 19 secured to the outer end thereof arranged to engage roof trusses supported thereon to prevent them from sliding off of the horizontal members 10 while being transported.

Means, such as a withdrawable spring urged pin 18b extendable through spaced holes 18a in the horizontal member 10 may be employed to prevent relative rotation between the extension arm 18 and the horizontal member 10, to permit the arm 18 to be secured in adjusted position with relation to the frame member 10 and to limit outward movement of arm 18 with relation to member 10. When the pin 18b is withdrawn the extension arm 18 may be rotated with relation to the horizontal member 10 to allow the lug 19 to project downwardly and permits the arm 18 to be moved outwardly to align the pin 18b with one of the holes 18a in the arm 18 to secure same in such outward position so that the roof trusses may slide off the end of the extension arm 18 instead of being abruptly deposited on the ground.

As will be seen in FIGURE II the extension arms 18 are telescoped inwardly and disengageably secured in such position, with the lugs 19 projected upwardly to support a bundle of roof trusses 44 thereon, in such inward position.

Upwardly projected lugs 20 are provided on the inner ends of the horizontal members 10 to support the roof frames against sidewise movement on the horizontal members 10. Vertically disposed plates or standards 21 are secured to the front frame member 4 and rear frame member 6 so as to project upwardly therefrom. The standards 21 are braced and held in position by braces 22 extending between the frame members 4 and 6 and the upper ends of the standards 21.

A semi-circular shaped cradle 23 (FIGURE V) is secured to the upper end of each of the standards 21 which are arranged to receive the inner free ends 10a of the horizontal members 10 and to support the same when the support members 8 and 9 are in upward position, as shown in FIGURE III.

The springs 24 are attached between the vertical frame members 11 and are arranged to be extended when the support members 8 and 9 move outwardly, and to retract and move the support members back to original upright position when the load is relieved from the support members.

Hydraulic cylinders 25 are pivotally secured at their ends to the vertical member 11 of the frame members 8 and 9 at each end of the trailer device. Each hydraulic cylinder 25 has a piston rod 26 movably extending through the other end thereof which has a piston on the inner end thereof slidably disposed in the cylinder 25. Each rod 26 is pivotally secured at its outer end to the opposite member 11 from that to which the hydraulic cylinder 25 is attached.

The hydraulic fluid lines 27 and 28 are arranged to communicate through a valve 29. The valve 29 is a conventional plug type valve which is rotated to open and close by the rotation of a shaft 30. An arm 30a extends from the shaft 30, and is pivotally coupled to a connector member 30b which in turn is connected to control cable 31. The arm 30a is urged inwardly by a spring 30c, the outer end of which is attached to a lug 30d secured to the member 3. The valve 29 is returned to closed position by the relaxation of spring 30c when the control cable 31 is released after being pulled outwardly to open the valve.

There is one of such valve assemblies and actuating mechanism at each end of the trailer device which controls communication between hydraulic lines such as 27 and 28.

The hydraulic lines 27 ad 28 comunicate with opposite sides of the pistons in the cylinders 25 so that when the valve 29 is closed fluid is trapped on opposite sides of the piston whereby it can not move, thereby holding the support members 8 and 9 in upward position. When the valve 29 is opened fluid is permitted to flow between opposite sides of the piston as the piston is caused to move with the fluid by reason of relative movement of the piston rod and the cylinder in response to pressure exerted by reason of the weight exerted on the support frames 8 and 9 by the load thereon when the support frames are released from upward position, as hereinafter described.

Separate valve control cables 31 and 32 are provided for actuation of each of the valve members 29, said control cables extending through the tubular frame member 3 and through holes in the plate 17 at the rear of the trailer. The control cables 31 and 32 are accessible from the rear of the trailer whereby both valve members may be opened at once. The control cables 31 and 32 have grasping knobs 33 on the outer end thereof.

A pair of sockets 34 are secured to each of the horizontal members 10, said sockets being welded or otherwise securely mounted thereto.

The sockets 34 are arranged to receive the legs 36 of extension frames 35, which may be inserted in said sockets to effectively extend the support members 8 and 9 upwardly. Each extension member 35 includes a transverse support portion 37 which has upwardly extending lugs 38 thereon to limit lateral movements of roof trusses disposed thereon. It will be seen from FIGURE I that when the legs 36 extension frame members 35 are inserted in the sockets 34 enlarged roof frames 45 may be disposed thereon without touching the ground.

The extension frame members 35 have attachment lugs 39 thereon whereby cables 35a may be attached thereto and attached to the base frames 4 and 6 to support and stabilize same.

A stiffener chain 40 is provided to adjustably extend between stanchions 21 in order to prevent the outward flexure and distortion of the stanchions. The braces 22 prevent stanchions 21 from inward flexure and distortion. The stiffener chain 40 is adjustably secured to stanchions 21 by being passed through holes 41 provided through the stanchions and the link of the chain is turned edgewise and disposed in the slot 42 to thereby engage the stiffener chain 40 between the stanchions 21. The stiffener chains 40 prevent the weight of roof trusses from expanding the stanchions 21 outwardly.

The pivoted support members 8 and 9 are detachably secured in upward position by means of take-up links 46, commonly called "boomers." Each take-up link includes a pivoted link 47 attached to the outer end of the handle 51 and a pivoted link 49 attached intermediate the ends of the handle 51. The pivoted link 47 is attached to an eye bracket on stanchion 21, and the pivoted link 49 is disengageably hooked to a chain link 50 on the horizontal member 10 (see FIGURE IV).

It will be seen that the take-up link 46 may be opened and extended to allow the hook on the end of the link 49 to be attached to the chain link 50 and the take-up link may be shortened by moving the handle 51 to a position parallel to take-up link 49, as shown in FIGURE IV, to thereby tighten same, and disengageably support the support frames 8 and 9 in upward position.

By the provision of the disengageable take-up link 46, the support frames 8 and 9 may be selectively disengaged and lowered to unload only one bundle of roof trusses 44 on one side of the trailer. For instance if it is desired to unload only one bundle of roof trusses 44 the boomer assembly 46 may be disengaged from the support members 8 and 9 on only one side of the trailer at each end thereof to allow the support frames 8 and 9 to pivot downwardly and outwardly to deposit the bundle of roof frames upon the ground.

The operation and function of the trailer device hereinbefore described is as follows:

The frame members 8 and 9 are initially in upward position and the valves 29 are closed, and held in upward position by hydraulic fluid held and trapped on either side of the pistons in the cylinders 25, and they are disengageably held in upward position by the take-up link assemblies 46 attached between the stanchions 21 and the pivoted support frames 8 and 9. Bundles of roof trusses, or other articles to be transported, are deposited on the horizontal members 10 in the position shown in FIGURES I and III. The bundles of roof trusses are normally tied together by metal straps.

If it is desired to unload both bundles of roof trusses 44 simultaneously the boom assemblies 46 will be disengaged from the chain section 50, and both control cables 31 and 32 will be pulled outwardly to open both valves 29 simultaneously to thereby permit the weight of the bundles of roof trusses 44 to pivot the support frames 8 and 9 downwardly and outwardly.

Prior to this procedure the spring urged pins 18b are withdrawn, the extension arms 18 are rotated to cause the lugs 19 thereon to project downwardly, and the arms 18 are pulled outwardly to engage the pins 18b in one of the adjustment holes 18a.

As the support members 8 and 9 pivot arcuately outwardly the bundle of roof trusses will slide along the extensions 18 until the lower apex thereof engages the ground at which time they can be gently lowered to the ground to rest on their sides, thereby preventing damage thereto.

Furthermore, as the support members 8 and 9 moved arcuately downwardly and outwardly the flow of hydraulic fluid between the pistons in the cylinders 25, through the lines 27 and 28 and open valve 29 cushions the downward movement of the support members 8 and 9 to gently deposit the roof truss bundles 44 on the ground.

As the loaded support members 8 and 9 move downwardly the springs 24 are expanded and when the bundles 44 are deposited on the ground and removed from the support members 8 and 9 the springs 24 will be allowed to retract, and move the support members 8 and 9 upwardly to initial position as shown in FIGURE III. The control cables 31 and 32 are then released to close the valves 29.

If a single bundle of roof trusses, or other load being carried, is desired to be deposited only the take up links 46 on one side of the trailer will be disengaged to allow only the bundle of roof trusses on that particular side to be deposited.

In the event it is desired to transport bundles of extra large roof trusses, the legs 36 of the extension frames 35 may be inserted in the sockets 34 on one or both sides of the trailer frame as illustrated in broken lines in FIGURE I.

It will be understood that other and further embodiments of the invention may be devised without departing from the spirit and scope of the appended claims.

Having described my invention I claim:

1. In a trailer device, an elongated central frame member; a front frame member attached to the central frame member; a rear frame member attached to the central frame member; a pair of load support members pivotally attached to the front and rear frame members arranged to pivot laterally outwardly thereof; each load support member including a horizontal member, a vertical member, angularly extending members secured to the horizontal member and a longitudinal member rotatably attached to the frame member to which the lower end of the vertical member and the angularly disposed members are secured; fluid support means attached between the load support members to hold the load support members in upward position, each said fluid support means including a hydraulic cylinder attached to one of the vertical members, a piston rod pivotally attached to the other vertical member, said piston rod having a piston on the inner end thereof slidably disposed in the cylinder, a fluid conduit communicating with each cylinder at each end thereof, valve means positioned in each conduit to open and close the flow of fluid through the conduit, and control means operably attached to the valve means accessible at one end of the trailer whereby the valve means may be operated from one end of the trailer; and spring means attached between the support members arranged to move the support members to upright position after being pivoted outwardly to dump a load.

2. The combination called for in claim 1 wherein the central frame member is tubular and the valve means are mounted within the central frame member; and the control means are lines which extend from the valve means to one end of the trailer device.

3. In a trailer device, an elongated central frame member; a front frame member attached to the central frame member; a rear frame member attached to the central frame member; a pair of load supporting members pivotally attached to the front and rear frame members, each said support member being pivotable outwardly to one side to deposit a load carried thereon; each support member including a vertical member and a right angularly disposed transverse tubular member; an extension arm slidably disposed in each tubular member; and means detachably engageable between the transverse members and the extension arms to retain the arms in adjusted position in the transverse members to facilitate unloading the load.

4. The combination called for in claim 3 with the addition of spaced upwardly facing sockets on the transverse tubular members; and an extension frame having spaced legs thereon insertable into said sockets.

5. The combination called for in claim 3 wherein the detachably engageable means comprises a withdrawable pin extendable through the wall of the transverse member engageable with a hole in the arm.

6. The combination called for in claim 3 wherein the detachably engageable means comprises a withdrawable pin extendable through the wall of the transverse member engageable with spaced holes in the arm.

7. The combination called for in claim 3 with the addition of a vertical stanchion on each front and rear frame member, each stanchion having a cradle on the upper end thereof arranged to receive and support the load supporting members.

8. The combination called for in claim 7 with the addition of a flexible member adjustably attachable between the stanchions to restrain same against outward movement.

References Cited
UNITED STATES PATENTS

| | | | |
|---|---|---|---|
| 1,621,075 | 3/1927 | Larkin | 298—17 |
| 2,724,612 | 11/1955 | Linneman | 298—17 |
| 2,765,940 | 10/1956 | Nelson | 214—450 |
| 2,789,707 | 4/1957 | Wolf | 214—77 |
| 3,219,211 | 11/1965 | Malcom | 214—77 X |
| 3,091,498 | 5/1963 | Goodwin | 298—8 |
| 3,263,834 | 8/1966 | Tendresse | 214—77 |

RICHARD J. JOHNSON, *Primary Examiner.*